United States Patent
Harper et al.

[15] 3,679,923
[45] July 25, 1972

[54] AUTOMATIC WORK REPEATING MECHANISM

[72] Inventors: Kenneth B. Harper, Winnetka; Hubert J. Tremblay, Roselle, both of Ill.

[73] Assignee: Harper Associates, Inc., Winnetka, Ill.

[22] Filed: April 9, 1971

[21] Appl. No.: 132,741

Related U.S. Application Data

[62] Division of Ser. No. 852,538, Aug. 25, 1969.

[52] U.S. Cl. ............................ 310/128, 310/236, 310/231
[51] Int. Cl. ....................................................... H02k 47/08
[58] Field of Search ................ 310/46, 49, 127, 128, 129, 310/133, 231, 154, 236, 177; 321/29

[56] References Cited

UNITED STATES PATENTS

| | | |
|---|---|---|
| 1,361,546 | 12/1920 | Politowski ........................ 310/133 X |
| 1,464,184 | 8/1923 | Mansbendel ...................... 310/236 X |
| 1,799,347 | 4/1931 | Apple ................................. 310/236 |

FOREIGN PATENTS OR APPLICATIONS

| | | |
|---|---|---|
| 918,277 | 9/1954 | Germany ........................... 310/128 |
| 11,689 | 2/1896 | Switzerland ...................... 310/128 |

*Primary Examiner*—D. X. Sliney
*Attorney*—Parker, Carter & Markey

[57] ABSTRACT

A direct current electrical motor haVing a commutator formed of conductor elements and spaced rings thereon with first brushes engaging the elements and additional brushes engaging the rings; the method of operating a direct current motor which involves delivering direct current pulses to some commutator elements and to all of said elements to operate and bias the direction of said motor and operating a direct current motor to produce recordable signals.

5 Claims, 11 Drawing Figures

PATENTED JUL 25 1972 3,679,923
SHEET 1 OF 4
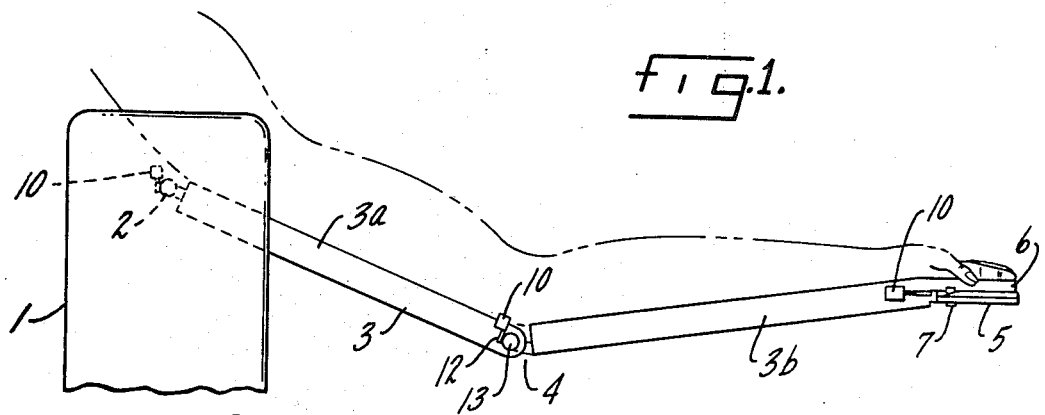
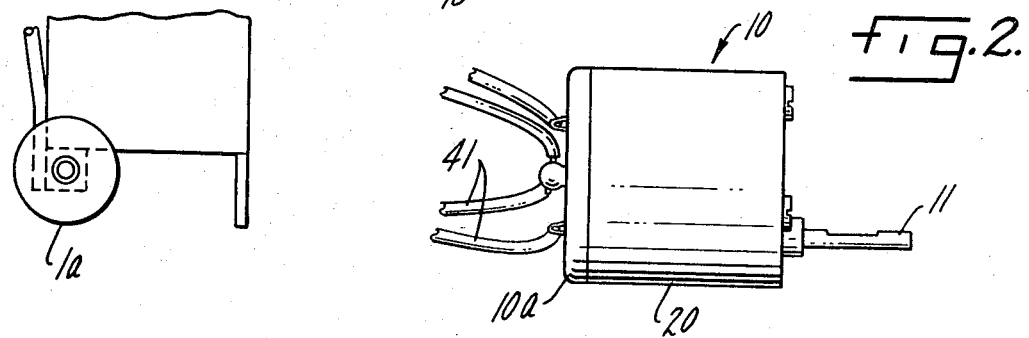
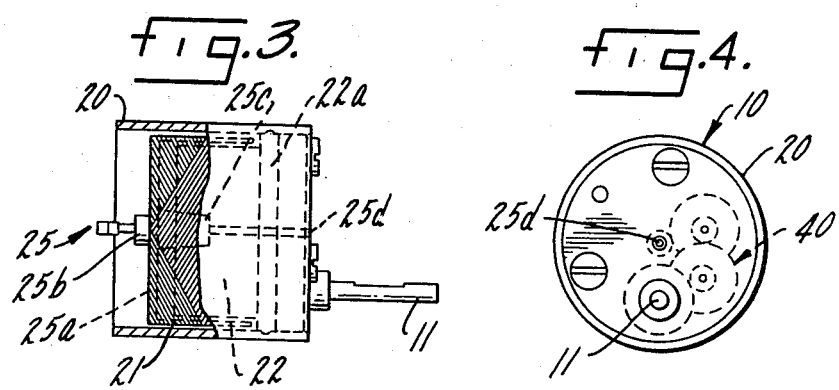
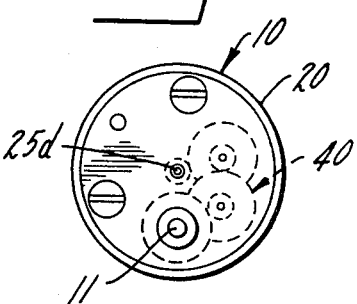
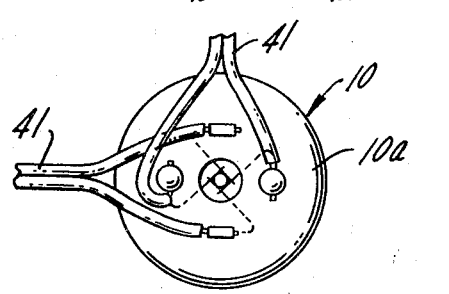
INVENTORS.
KENNETH B. HARPER
HUBERT J. TREMBLAY
BY Parker, Carter & Markey
Attorneys.

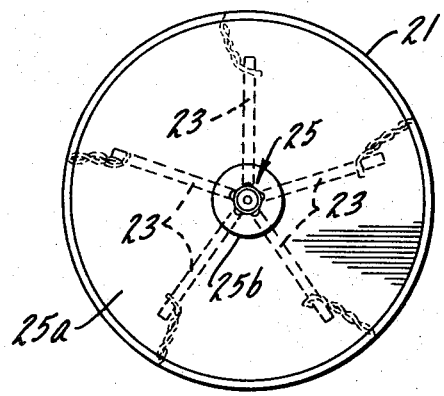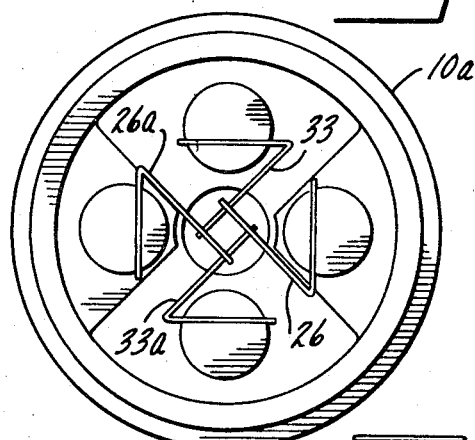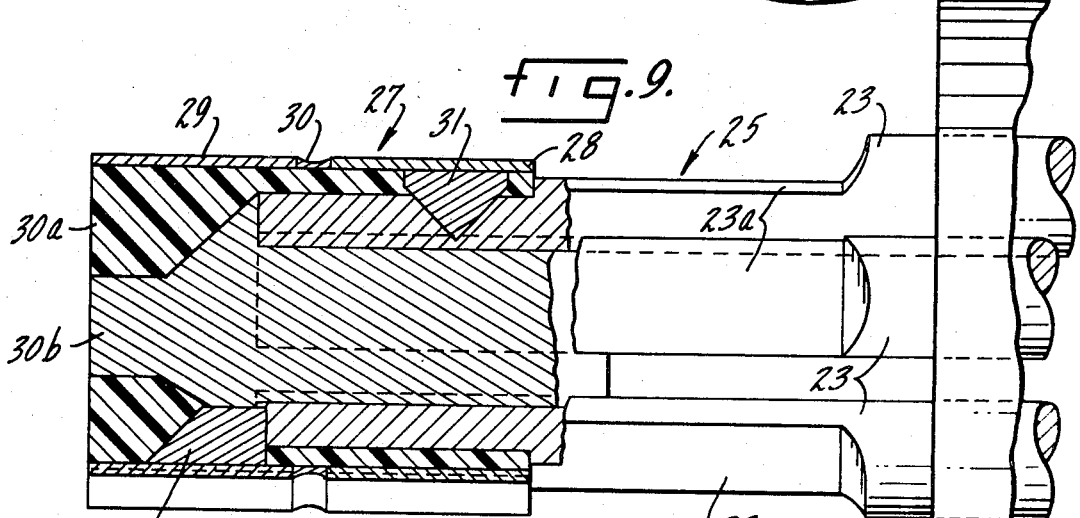

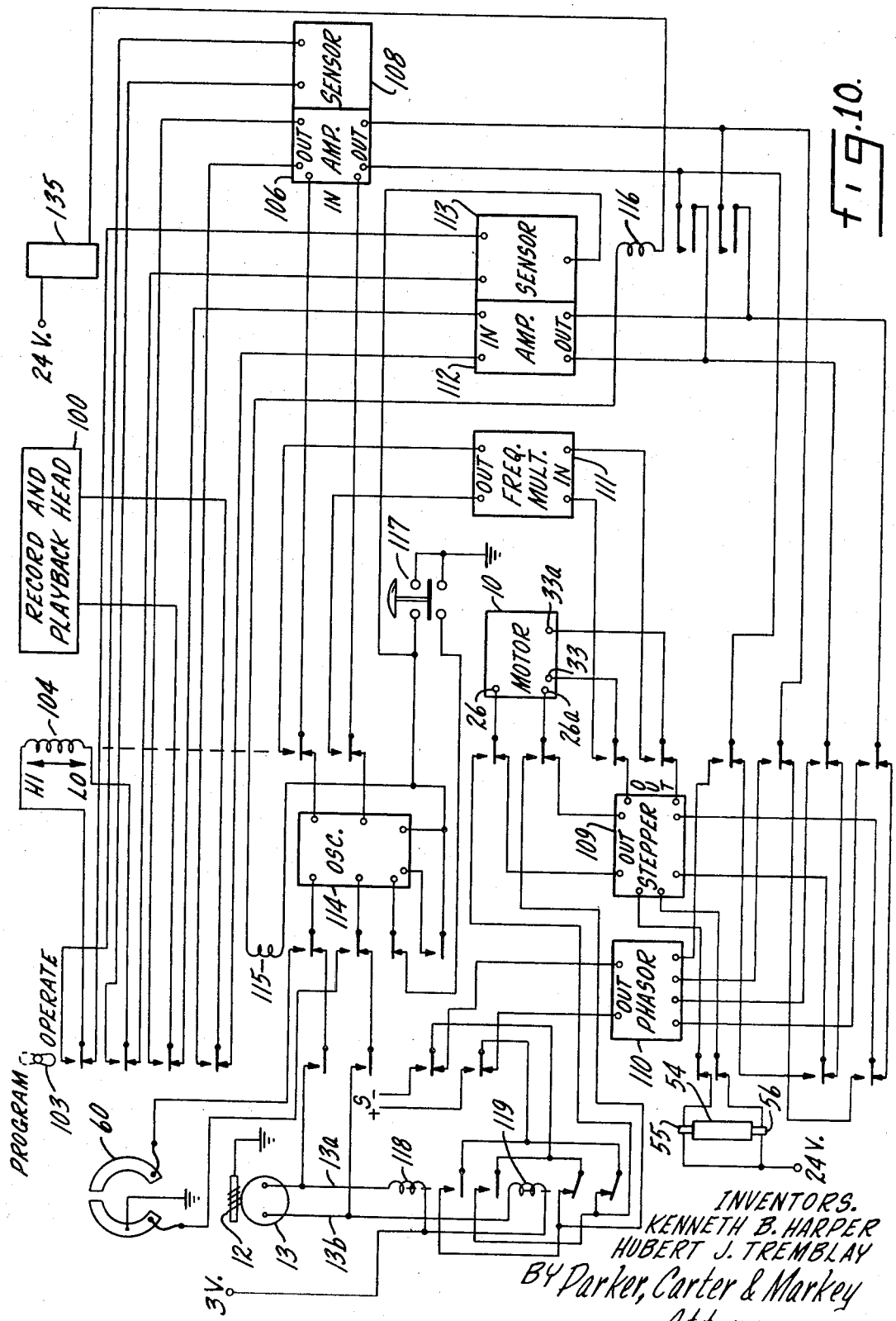

AUTOMATIC WORK REPEATING MECHANISM

SUMMARY OF THE INVENTION

This is a division of copending application Ser. No. 852,538, filed Aug. 25, 1969.

This invention relates to electrical motors and particularly to small electrical motors usable in programming and controlling automatic work-repeating mechanisms, for example.

One purpose is to provide an electrical motor energized by DC current and generating AC current.

Another purpose is to provide an electric motor energized by DC current and generating recordable signals.

Another purpose is to provide methods of operating an electrical motor.

Another purpose is to provide an electric motor and means for recording the action thereof.

Another purpose is to provide an electric motor and means for biasing the motor.

Another purpose is to provide an electric motor having commutator and slip ring elements, each with associated brushes.

Another purpose is to provide means insuring operation of an electrical motor in correspondence with signals on a record.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a side elevation illustrating a mechanism capable of employing the motor of the invention;

FIG. 2 is a side elevation of a motor of the invention;

FIG. 3 is a view similar to that of FIG. 2 with parts removed and parts broken away;

FIG. 4 is a detail view showing a gear train for the motor of FIGS. 2 and 3;

FIG. 5 is an end view of the motor of FIG. 2;

FIG. 6 is a detail view of an enlarged scale of an armature disc of the motor of FIG. 2;

FIG. 7 is a detail view on an enlarged scale of a brush-holding closure for the motor of FIG. 2;

FIG. 8 is a detail end view on an enlarged scale, with parts in cross section of a commutator shaft for the motor of FIG. 2;

FIG. 9 is a view taken on the line 9—9 of FIG. 8;

FIG. 10 is a schematic view of a circuit of the invention; and

Like parts are indicated by like numerals throughout the specification and drawings.

DESCRIPTION OF THE PREFERRED EMBODIMENT

Figure 11:
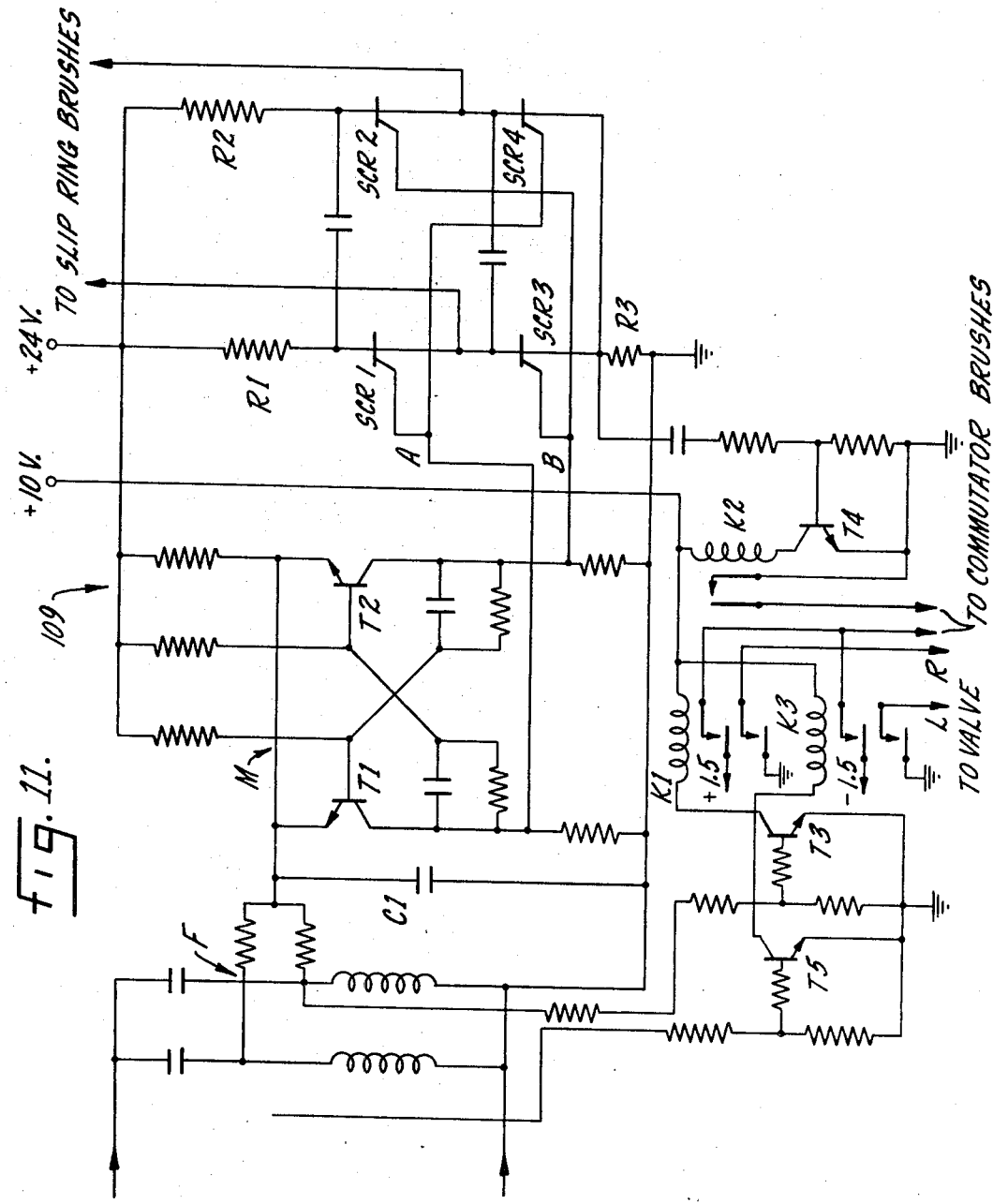
FIG. 11 is a schematic view of a stepper circuit of the invention.

Referring now to the drawings, and particularly to FIG. 1, the numeral 1 generally designates a support or base. The base 1 may suitably take the form of a rectilinear box or cabinet rendered portable by handle and wheel arrangement 1a, for example.

Mounted as at 2, externally of the base 1 and for movement thereon, is an arm element 3. The arm 3 is preferably formed of segments 3a,3b articulated as at 4. At the distal end of arm portion 3b a finger element 5 is articulated for movement toward and away from distal arm segment 6, as indicated at 7.

A thumb-size electric motor 10 is positioned adjacent each of the articulation points 2, 4 and 7, the motor at point 2 being mounted on base 1 for movement control of arm segment 3a, the motor at point 4 being mounted on segment 3a for movement control of segment 3b and the motor at point 7 being mounted on segment 3b for movement control of finger 5.

The motor 10 is illustrated in FIG. 2-9 and includes a cylindrical motor housing 20 serving as a magnetic flux retainer. Rotatable within the housing 20 is a crisscross wound barrel armature winding 21. The winding 21 surrounds a disc magnet 22, the magnet being suitably centered about the axis of winding 21 and fixedly secured to an insulating housing divider wall 22a as by an adhesive for example. Inwardly, radially directed wires 23, preferably five in number, are suitably connected to and extend from the winding 21, having their inner ends extending axially in circumferentially spaced, parallel relationship to form the commutator shaft 25. A light weight, plastic disc 25a with axial collar 25b supports wires 23 and shaft 25 rotatably with winding 21.

A pair of brushes 26,26a are provided for transmittal of DC current and are hereafter referred to as commutator brushes. The brushes 26,26a are spring-urged against the shaft 25 on opposite sides thereof for sequential contact with the machined, reduced curvature surfaces 23a of wires 23 as the shaft 25 formed thereof rotates.

A shaft extension or slip ring collar 27 is secured to the distal end of the shaft 25 formed of wires 23. The collar or extension 27 includes a first ring 28 and a second ring 29 with an insulated area 30 positioned therebetween. The area 30 may, for example, be filled with an appropriate varnish. The area within collar 27 and between wires 23 therein is filled with an insulation material such as plastic 30a and glue 30b. The ring 28 is suitably secured to one of the wires 23, as indicated at 31, a silver compound being suitable for the connection 31. The ring 29 is suitably secured to a second wire 23 by a second supply of silver compound, as indicated at 32.

A brush 33 is continuously, yieldingly urged against the ring 28 of collar 27 and a brush 33a is continuously, yieldingly urged against the ring 29 of collar 27, the brushes 33,33a being hereinafter referred to as the slip ring brushes. The brushes 26,26a and 33,33a are carried by closure plate 10a.

The motor shaft 11 is suitably geared, as indicated generally at 40, to the center shaft 25d which is secured by boss 25c to plate 25a for rotation therewith in response to delivery of electrical energy to the motor 10, shaft 25d extending through magnet 22 and wall 22a. A ratio of 59 to 1 has been found effective between armature shaft 25d and output shaft 11. Appropriate electrical conductors, such as the wires 41, are connected through suitable terminals to the commutator and slip ring brushes.

A DC current across the commutator brushes will cause a corresponding rotation of the armature 21, the speed of rotation being substantially proportional to the voltage applied, the motor shown being capable of an armature speed, for example, of up to 40,000 r.p.m. In response to any rotation of the armature 21 and commutator shaft 25 a sinusoidal wave form is produced across the slip ring brushes 33,33a, generating a low level AC signal of up to 0.5 volts.

A DC current pulse across brushes 33,33a orients the armature winding 21 to a predetermined point at which the polarity of the winding 21 is opposite that of permanent magnet 22, i.e., North on winding 21 overlies South on magnet 22 and South on the winding overlies North on the magnet, a continued application of that current holding the armature in orientation. A reverse DC current across brushes 33,33a displaces the winding polarity, reversing South to North and vice versa, reorienting the armature with the magnet and "stepping" the armature half a revolution.

Referring now to FIG. 10, there is illustrated a circuit and associated components effective in illustrating a suitable application of the motor and operating method of the invention. A recording and playback head 100 may be of conventional, well known construction. A "program-operate" switch 103 is shown in its full line "operate" position. Accordingly, a series of switches aligned on the drawing with the manually operable switch 103 are shown in their "operate" positions. Similarly, a high-low relay 104 is supplied with energy of the order of 24 volts and controls a series of switches aligned therewith in FIG. 10, said switches being shown in their "low" position.

A program or recording amplifier 106 has associated therewith the sensor 108. Indicated at 109 is a low speed control or stepper component. A phase detector comparator or phasor component is indicated at 110. A frequency multiplier is shown at 111. An operate or playback amplifier 112 has sensor 113 associated therewith. An oscillator 114 is shown adjacent a rewind relay 115 which, it will be understood, controls the four switches shown as aligned therewith in the drawing. A second rewind relay is shown at 116, controlling the switches shown therebeneath. A homing and rewind double switch button is indicated at 117. Gear switch leads 13a, 13b are connectable, respectively, to the two upper terminals of oscillator 114 and are connected to relays 118,119 for respective control of the switches shown adjacent, aligned with and beneath each of said relays.

Referring now to FIG. 11, the slow speed control or stepper 109 is illustrated. The input terminals at the left of the drawing have the filter F thereacross. Beyond the filter F the multivibrator M, formed of transistors T1, T2 and associated components, delivers voltage to points A or B and thence, respectively, to a dual silicone controlled rectifier formed of SCR1, SCR4, SCR2, SCR3 and associated components. A transistor T3 is fed one signal from the input for activation of a relay K1 and a transistor T4 controls a relay K2. Transistor T5 is fed a signal from the input and controls a relay K3 which, in conjunction with relay K1, will deliver energy through their respective switches to solenoid 55 or 56. At the lower center right of FIG. 11 the arrows indicate outputs to the commutator brushes 26,26a. The arrows at the upper right hand portion of FIG. 11 indicate outputs to the slip ring brushes 33,33a. Those at the lower left center indicate outputs to solenoid valves 55,56.

The use and operation of the invention are as follows:

As shown in FIG. 1, the operator places his own arm and fingers over the arm 3, segment 6 and finger 5. Where necessary, the arm portion 3b may be suitably strapped or otherwise secured to the forearm of the operator, the arm portion 3a may be suitably secured to the upper arm of the operator and the finger parts 5,6 may be secured to the thumb and index finger of the operator. The operator then manipulates or moves the arm portions 3a and 3b and finger 5 to perform the function normally performed by the operator in his daily work routine.

In view of the gearing involved, provision has been made for electrical assistance permitting movement of the gears 13, worms 12 and motors 10 in response to manual movement of the arm 3 and finger elements 5,6.

In the programming stage, manual movement of arm segment 3b, for example, would cause rotation of double annuli gear 13, yet mechanical transmittal of motion from gear 13 to worm 12 is not feasible. Rotation of gear 13, however, produces contact of the teeth of one of the annuli with the worm, thus grounding that annuli through its lead 13a or 13b and producing a circuit therethrough, the resulting circuit, as described below, being effective to drive the motor 10 in one or the other direction corresponding to the direction of movement imparted to the arm of the operator. Thus the grounding of worm 12 through gear 13 functions as a single pole, double throw switch and the motor 10 is employed to drive the worm in correspondence with motion imparted to the gear 13 by the operator in moving the arm segment 3b, for example. As the operator continues motion of the segment 3b, the motor 10 is continuously stepped in response to energy delivered as a result of worm and gear contact and the worm is rotated out of the way of the teeth of gear 13.

The direction and extent of rotation of gear 13 at slower speeds is thus recorded in the form of a suitable tone or signal on a tape for later delivery to motors 10.

As the motors 10 are actuated in response to faster, continuous manual manipulation of the arm 3 and fingers 5,6, the direction, speed, and duration of each rotation of each motor is recorded on a tape in the form of a suitable tone or signal.

The operator then removes his arm and hand from the arm 3 and fingers 5,6. The tape is rewound to its original position.

Thereafter the tape is traversed across the head 100 and the signals on the tape are played back through head 100 and amplifier 112 to the motors 10 to cause the arm 3 and fingers 5,6 to repeat precisely the functions accomplished when the arm 3 and fingers 5,6 were secured to the arm and fingers of the operator. Operation of motor 10 to rotate the worm 12, in effect, may also move the worm out of the way of gear 13 to permit actuation of the arm 3, for example, by a power means such as that shown at 54 or by other suitable power means.

In the programming step or phase of operation, the switch 103 is placed in its dotted line or "program" position. Thereupon all of the switches shown in alignment with the switch 103 in FIG. 10 are placed in their upward position.

For simplicity the movement of arm segment 3b in relation to arm segment 3a is considered, it being understood that the description thereof applies equally to the simultaneous or sequential movements of all of the other arm and finger segments. In the simplified showing of FIG. 1, for example, each of the motors 10 has its discrete track on tape and its own circuit such as that illustrated in FIG. 10.

Accordingly, as arm segment 3b is rotated motion is imparted to gear structure 13. Upon contact of the teeth of gear 13 with worm 12 a circuit is created. With switch 103 in "program" position, the control system is set to accept program information and to provide electrical assistance permitting and abetting manual manipulation of the structure.

The gear-switch structure 12,13 is thus connected to the oscillator 114 for production of the selected "low" signals of 4,000 or 6,000 cycle per second signal frequencies, depending upon the direction of rotation, clockwise or counterclockwise, of gear structure 13.

A high-low relay 104 is supplied with energy of the order of 24 volts and controls the switches shown in alignment therewith in FIG. 10. As shown, the full line position of said switches corresponds to the low speed position of relay 104. The output of oscillator 114 is connected to amplifier 106 with relay 104 in low speed configuration and the output of amplifier 106 is connected to sensor 108, recording head 100 and stepper 109.

Either the 4,000 or the 6,000 cycle input signal to oscillator 114 will thus be grounded as gear 13 is rotated, resulting in transmittal of that frequency from the oscillator 114 to amplifier 106. The sensor 108, detecting the signal to be one of the preselected low speed indicators, energizes the relay 104 to position the switches controlled thereby in their "low" position shown.

The output of oscillator 114 is thus amplified and recorded by amplifier 106 on the tape through head 100. At the same time the same signal is fed from amplifier 106 to stepper 109, producing continuous application of a reversing DC voltage to the slip ring brushes 33,33a of motor 10 and a momentary DC pulse to the commutator brushes 26,26a providing both operating energy and direction information to the motor in the low speed mode, the stepper 109 distinguishing between the 4,000 or 6,000 cycle signal to produce direction information. Activation of motor 10 thus frees gear 13 to rotate.

As the operator manipulates the elements 3,5 at a higher speed, sensor 108, sensing the higher frequency output of amplifier 106, causes relay 104 to switch into its "high" mode, placing all of its switches in their upper positions. As elements 3,5 are manually manipulated in this mode, motor 10 is operating and worm 12 and the teeth of gear 13 are continuously making and breaking contact, producing momentary closures of the switches of relays 118 and 119 or neither to feed from source S either a positive or negative or no voltage to commutator brushes 26,26a, giving the motor 10 accelerating or decelerating pulses, the combination of which will control the speed of the motor so that worm 12 maintains, in effect, a centered position between the teeth of gear 13 throughout any displacement of gear 13 and gear 13 is thus freed to rotate in either direction.

With the switches controlled by relay 104 in their high position, the output of the slip ring brushes 33,33a of motor 10 produces a recordable signal and, when desired, the output of brushes 33,33a may be connected to a frequency multiplier 111 from whence a greatly multiplied signal may be delivered to amplifier 106 for recording by head 100 on the tape.

Since amplifier 106 remains continuously connected to recording head 100 while the switch 103 is in its "program" position, the proper frequency signals are continuously applied to head 100 and a continuous record of the actions of gear 13 and motor 10, their speed and direction of rotation as well as any periods of inactivity, is formed on the tape.

Upon the disengagement of the workpiece or pieces, and the consequent completion of the work program, a suitable rewind signal of a discrete frequency, such as 8,000 cycles, for example, is supplied to and deposited on the tape by operation of a suitable button switch 117. Said signal will be later sensed by sensor 113 to activate a rewind mechanism in tape transport 135. Various types of tape-transport and winding means may be employed without departing from the spirit of the invention.

Depression of momentary rewind/homing button 117 sequentially closes two separate switch paths. Since elements 3,5 are stopped, the switches controlled by relay 104 will be in their "low" positions shown. The first closed path connects ground to the lower left side input of oscillator 114 causing the oscillator to generate the discrete, e.g., 8,000 cycle, tone which is fed through amplifier 106 and recorded on the tape through record head 100.

As button 117 is depressed further, the second path is closed which applies ground to the rewind relays 115,116, causing the relays to operate their associated switches. The rewind signal input to the oscillator is thus disengaged and the 4,000 and 6,000 cycle directional signal inputs from a bezel 60 are connected to oscillator 114. Relay 115 also closed a path to the left hand bottom terminal of the oscillator to place that terminal at ground potential and to energize a motor interrupter (not shown) in the oscillator and also to hold the rewind relay 115 operated.

With the interrupter energized, the operate path of the oscillator circuit is interrupted at a predetermined rate of approximately thirty pulses per second to produce a predetermined speed at which elements 3,5 return to their home base positions. Thus a stream of pulses of either 4,000 or 6,000 cycle frequency, depending on the direction of run required to home base, is generated by the oscillator 114 so long as ground is received from bezel 60. When the home position is reached and ground is removed, the signal is removed from the base of oscillator 114 thereby releasing the motor interrupter and the homing relays 115,116 simultaneously and causing the oscillator to cease functioning.

When the operator desires to operate the mechanism of the invention, the foregoing programming phase having been completed, the switch 103 is placed in its "operate" position positioning all of its aligned switches in their "operate" position as shown in FIG. 10. At the same time, as in the programming stage, the tape transport 135 will be activated by a suitable connection (not shown) with switch 103 and the tape will be moved across head 100 for playback of the tape.

The signals on the tape are amplified in amplifier 112 and sensed by sensor 113. At the outset, one of the predetermined low speed signals, of 4,000 or 6,000 cycles per second, for example, will be sensed, causing sensor 113 to activate relay 104's "low" side and thus to position its controlled switches in their "low" position as shown in FIG. 10.

The low speed signals are conveyed to stepper 109, which converts the bursts or pulses of 4,000 or 6,000 cycle signals to DC reversals which are held in alternate polarity across slip ring brushes 33,33a of motor 10, each reversal producing a 180° rotation of the motor. The stepper 109, as described below, detects whether the signal is 4,000 or 6,000 cycles, thus indicating clockwise or counterclockwise direction, respectively, and the bias element of the stepper will accordingly supply a momentary DC pulse, positive or negative depending on direction, to the commutator brushes 26,26a of motor 10.

As the frequency received from the tape and head 100 changes from the 4,000 or 6,000 cycle per second format to the high mode frequency range, the sensor 113 energizes the high-low relay 104 to its high position, throwing the switches aligned therewith in FIG. 10 to their upper position. Accordingly, the output of amplifier 112 will be directed into the phasor 110; the output of amplifier 106 will also be directed into phasor 110; the output of phasor 110 will be connected to the commutator brushes 26,26a of motor 10 through the switches controlled by relay 118 or relay 119.

The inputs from amplifiers 112,106 to phasor 110 are compared in its phase-detector circuit. Depending upon the relationship of said inputs, a controlled higher or lower DC voltage is applied by phasor 110 to the commutator brushes 26,26a to regulate the speed of motor 10 and to insure its identity with that recorded on the tape in the programming step described above.

Referring now to FIG. 11, the output of amplifier 112 or 106 is delivered to the low speed control or stepper 109 in the form of pulse bursts of either 4,000 or 6,000 cycles per second frequencies, producing in either case a voltage peak at the appropriate mid-point of the two circuits shown across the inputs and applying a positive potential to the trigger input of a multivibrator formed of transistors T1,T2 and associated components. Capacitor C1 filters out the 4,000 or 6,000 cycle frequency which makes up the pulse leaving only the pulse envelope as the triggering signal at the emitters of the two transistors T1,T2, the transistors T1,T2 operating alternatively on successive pulses. Thus a positive DC triggering pulse is produced alternatively at points A and B. The pulse delivered at A appears also on the gates of dual silicone controlled rectifiers SCR2 and SCR3 causing them to conduct and to produce a current from the positive 24 volt supply shown through resistor R2, through SCR2 to slip ring brush 33a, through the armature winding to brush 33, through SCR3 and R3 to ground. The alternating pulses appearing at point B appear also on the gate of rectifiers SCR1 and SCR4, producing a current flow through R1, through SCR1 to slip ring brush 33, through the armature winding to brush 33a, and through SCR4 and R3 to ground. Thus the stepper circuit delivers a DC current continuously to the slip ring brushes 33,33a but the stepper reverses the direction of that current in response to each 4,000 or 6,000 cycle per second pulse received, each such reversal resulting in a 180° rotation of motor 10.

Signal inputs from the 4,000 cycle filter across the input from amplifiers 112 or 106 are fed to transistor T3 causing it to conduct and to operate relay K1, the relay K1 being supplied as shown with a lower power supply of the order of 10 volts. Activation of relay K1 delivers a positive 1.5 volts from the source indicated to commutator brush 26 for a short pulse at the start of any four thousand cycle pulse burst. Signal inputs from the 6,000 cycle per second filter are fed to transistor T5 causing it to conduct and to operate relay K3 and thus delivering a negative 1.5 volts to commutator brush 26. Transistor T4 is caused to conduct in response to conduction in the multivibrator formed of the SCRs and associated components, the period of conduction of T4 controlled by its input circuit. With T4 conducting, current flows through the winding of relay K2 and a ground pulse is applied to DC brush 26a.

Thus the output of the slow speed control illustrated in FIG. 11 is shown as delivered directly to the slip ring brushes 33,33a and thus to the slip rings 28,29 of motor 10 to apply DC reversals at a rate controlled by the input to the slow speed control unit 109 and to provide driving force for the motor 10. At the same time, the circuit of stepper or slow speed control 109 provides a biasing potential to the DC brushes of the motor through relay K1 or K3 and K2 to insure the correct, clockwise or counterclockwise, direction in the rotation of the motor produced in response to the power reversals supplied to brushes 33,33a.

The phasor circuit is designed to provide close control of the motor within the range of phasor operation, i.e., in the high speed mode. There is substantial overlap in motor r.p.m. between low and high mode operation, the staccato or stepping operation in low mode being distinguishable in such respect from the continuous, steady operation in high mode.

With relay 104 and its switches in the "high" or upper positions, one set of terminals of the phasor are connected through amplifier 106 and frequency multiplier 111 to the slip ring brushes 33,33a of the motor 10. The signal at these terminals is therefore a reading directly from the motor of its speed of rotation. The form of the signal is a sign wave multiplied by a preferred factor of eight through frequency multiplier 111 and amplified in amplifier 106 to a level suitable for detection. The signal received at adjacent phasor terminals is from amplifier 112 and is the same signal previously recorded on tape during the programming operation of the invention.

Thus the phasor DC output current is employed to drive the motor 110 through its commutator brushes 26,26a, the phasor circuit speeding or slowing the motor to correspond to the performance called for by the tape.

When the programmed operational cycle is completed, the eight thousand cycle tone recorded onto the tape at the end of the programming cycle, as described above, is sensed by sensor 113 and translated into a ground at the output shown at the bottom of the sensor 113 in FIG. 10. This ground bypasses button 117 and is applied to the rewind/homing relays 115,116, causing them to operate. From that point on the rewind/homing cycle is identical to that which occurs in the program mode as described above. The arm and finger elements 3,5 will be returned to their pre-set home base positions and the tape will be rewound by means 135 for automatic repetition of the work function.

Thus is may be considered that the operation of the invention generally encompasses seven conditions or modes in which the circuitry and various components illustrated in FIG. 10 are variously operative.

In the program-low mode, contact of worm 12 with double gear 13 grounds lead 13a or 13b depending on direction of gear rotation. The appropriate upper left hand terminal of oscillator 114 is grounded, delivering a corresponding signal to amplifier 106 from which it is recorded on the tape through head 100. The same signal is delivered through the stepper 109, stepping the motor in the correct direction in response to each signal from gear 13 and delivering motive power to motor 10 through its slip ring brushes and biasing or directionally urging motor 10 through its commutator brushes to permit rotation of gear 13.

In the program-high mode motor 10 is driven directly by plus or minus pulses from source S. Grounding of leads 13a or 13b activates relay 118 or 119, respectively, determining whether a plus or minus pulse is delivered to the commutator brushes. The AC output across the slip ring brushes is delivered through multiplier 111 to amplifier 106 for recording on the tape through head 100.

The end program-signal mode is employed but once in establishing a given program. The system is always in program-low mode at the end of the program. The first contact on depression of button 117 grounds the lower left hand terminal of oscillator 114 to produce a discrete signal recorded on the tape through amplifier 106 and head 100.

The end program-rewind/homing mode occurs upon full depression of button 117 activating rewind relays 115,116. The lowermost switch controlled by relay 115 holds the relay in operation after button 117 is no longer depressed. Since, as indicated, the system is in the program-low mode, the output of oscillator 114 is triggered by bezel 60 and delivered through amplifier 106 and the switches controlled by relay 116 to the stepper 109. Thus, if the elements 3,5 are not in home base position, the bezel 60 will drive the motor 10 through oscillator 114, amplifier 106 and stepper 109 to return the elements 3,5 to their home base positions. At the same time, the relay circuit will direct the tape transport 135 to rewind the tape.

In the operate-low mode the signals or tones from the tape are played through the playback portion of head 100 through playback amplifier 112 to stepper 109 which drives motor 10 as above described, delivering DC reversals to the slip ring brushes of motor 10 to step it in 180° revolutions and delivering DC pulses to the commutator brushes to provide direction information for each such half-revolution. Stepper 109 also energizes the appropriate solenoid 55 or 56 to operate valve 54 and boost 52.

In the operate-high mode sensor 113 detects the frequency signal for high-mode operation and shifts the circuit. The varying frequency signal from the tape through head 100 is delivered to playback amplifier 112 and then to the two left hand bottom terminals of phasor 110. The AC output signal of motor 10 is delivered through frequency multiplier 111 and amplifier 106 to the two right hand bottom terminals of phasor 110. Relay 118 or 119 is held continuously grounded by the continuous grounding or gear 13 through its continuous contact with worm 12, under urging of cylinder 52, in the high speed mode. Plus or minus output voltages are thus delivered to the commutator brushes of motor 10. When booster 52 is employed it remains in full boosting status as it was in the low mode, any change in direction requiring a passing back through low mode and a redirecting of booster 52 prior to a further high mode operation.

The bezel control-rewind/homing mode occurs at the end of the operate cycle. Since the motion of elements 3,5 is ceasing, the circuit will be in operate-low condition or mode. Sensor 113 will detect the discrete end-of-program or rewind signal on the tape as it is delivered by head 100 to amplifier 112. The bottom terminal of sensor 113 will then activate rewind relays 115,115, bringing bezel 60 into connection with oscillator 114, grounding one of the upper left terminals thereof and producing the appropriate signal to amplifier 106. Activation of relay 116 closes its switches, bringing amplifier 106 into connection with stepper 109 to drive the motor in the appropriate direction for return of the elements 3,5 to their home base positions. At the same time tape transport 135 rewinds and thereafter replays the tape, the work function of elements 3,5 being thus automatically repeated as often and for as long as desired.

The embodiments of the invention in which an exclusive property or privilege is claimed are defined as follows:

1. The method of operating a direct current motor having more than two circumferentially spaced commutator elements which includes the steps of delivering direct current pulses alternatingly to two of said commutator elements to operate said motor and delivering direct current pulses sequentially to all of said commutator elements to urge movement of said motor in a predetermined direction.

2. An electrical motor including a housing constituting a magnetic flux retainer, a hollow cylindrical cross wound armature winding rotatable in said housing, a disc magnet fixed in said housing, a plurality of wire elements secured to said winding and extending axially of said housing in circumferentially spaced relationship to form a commutator shaft and a first plurality of brushes engaging said shaft in circumferentially spaced relationship for sequential engagement of said brushes with said elements in response to rotation of said armature and said commutator shaft, each of said wire elements having a machined, reduced curvature portion positioned for engagement by said brushes, said elements being more than two in number, conducting rings surrounding and rotatable with said commutator shaft, each of said rings being connected to one of said elements and insulated from the remainder of said elements and from the remainder of said rings and a second plurality of brushes, each of said last-named brushes continuously engaging one of said rings.

3. The structure of claim 2 characterized by and including a motor output shaft, an armature shaft rotatable with said armature and a gear train transmitting motion of said armature shaft at a reduced ratio to said output shaft.

4. The method of operating a direct current electrical motor having a commutator shaft comprising more than two elements which includes the steps of continuously supplying a reversing direct current voltage to two of said elements to cause rotation of said shaft and supplying a momentary direct current pulse to said elements to bias the rotation of said shaft in a predetermined direction of rotation.

5. The method of claim 4 wherein each reversal of said reversing direct current voltage produces a 180° rotation of said shaft.

* * * * *